Aug. 24, 1965  R. D. SALMON  3,202,780
CENTRIFUGAL SPEED GOVERNORS WHICH MINIMIZES
THE EFFECT OF CONTACT EROSION
Filed Nov. 17, 1961  3 Sheets-Sheet 1
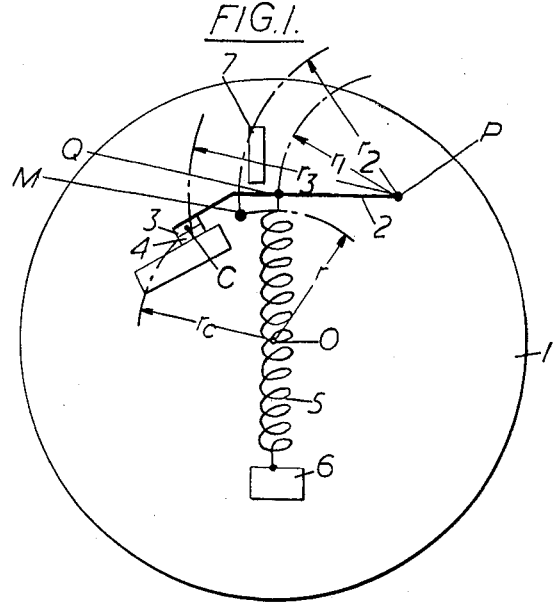
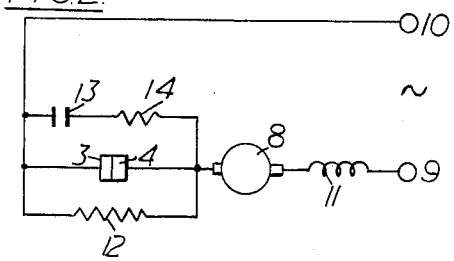
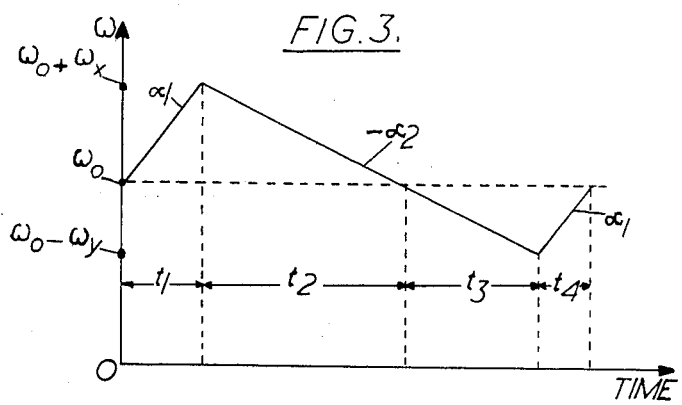
Inventor
REGINALD D. SALMON
By
Attorney

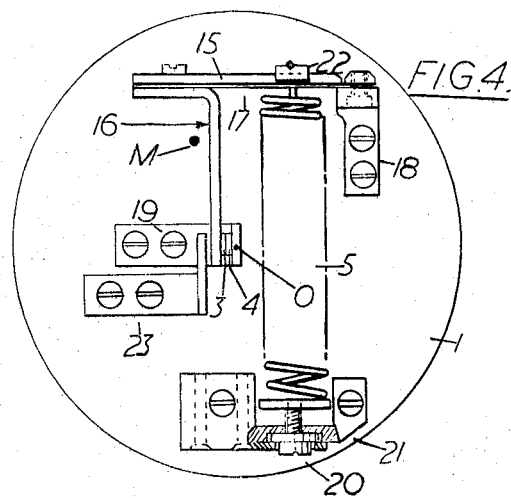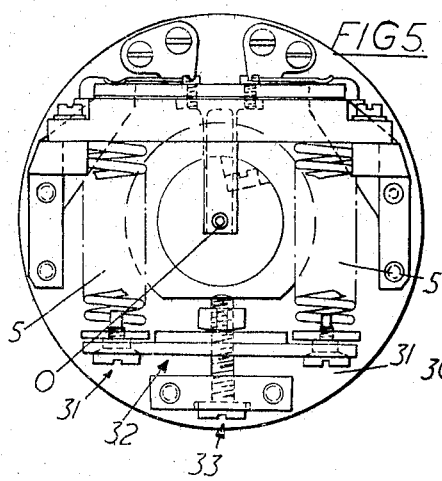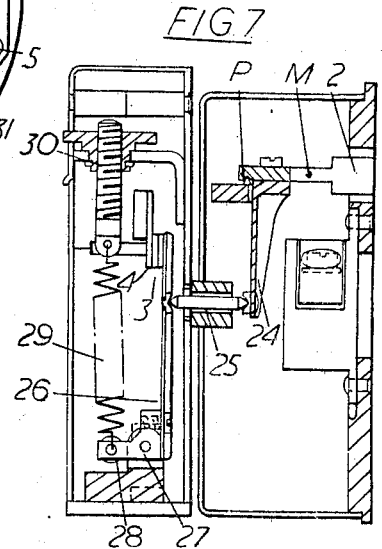

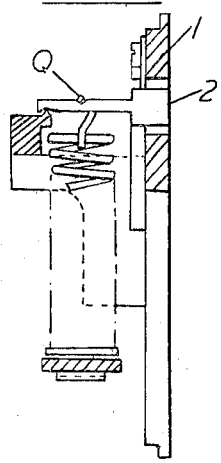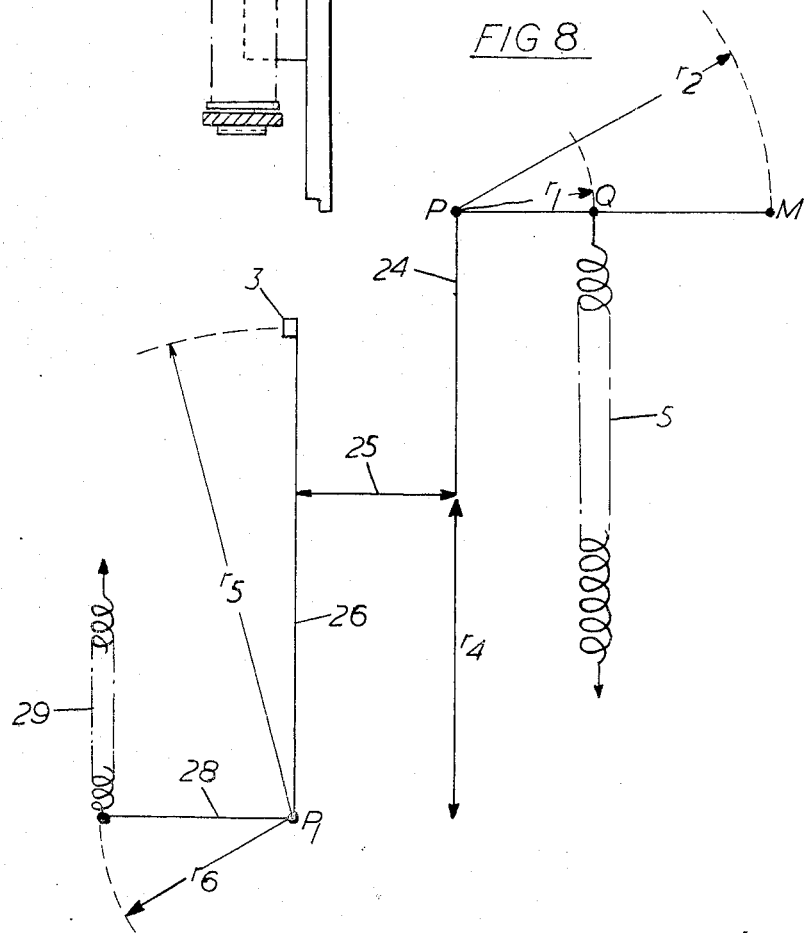

United States Patent Office 3,202,780
Patented Aug. 24, 1965

3,202,780
CENTRIFUGAL SPEED GOVERNOR WHICH MINIMIZES THE EFFECT OF CONTACT EROSION
Reginald Dennis Salmon, Croydon, England, assignor to International Standard Electric Corporation, New York, N.Y., a corporation of Delaware
Filed Nov. 17, 1961, Ser. No. 152,993
Claims priority, application Great Britain, Nov. 22, 1960, 40,100/60
6 Claims. (Cl. 200—80)

The present invention relates to improvements in centrifugal speed governors for electric motors.

The invention concerns more particularly, but not exclusively, speed governors for motors used to drive telegraphic apparatus.

In such applications, the motor speed has to be governed within close limits, and this has led to the adoption of what is known as the isochronous speed governor, of which an early example is described in United States Patent No. 1,868,616, granted to the present inventor on July 26, 1932.

In the case of a centrifugal governor, a pair of electric contacts is controlled by a pivoted governor arm mounted on a base plate which rotates with the motor shaft, the governor arm being acted upon by a spring or arrangement of springs, the resultant spring force of which acts to oppose the centrifugal force. The difference between the centrifugal force acting on the governor arm and this spring force causes the contacts to open or close, thereby respectively inserting or short-circuiting an impedance in the motor circuit, which causes the speed to decrease or to increase, respectively, so maintaining the mean speed of the motor within the required limits.

The term "spring force" is here employed, and will be employed throughout the remainder of the specification, to denote the resultant force operative upon the movable governor arm system due to all the spring members that act upon that system. Similarly, the term "spring characteristic" will denote the effective resultant spring characteristic of all those spring members.

There are two principal types of centrifugal speed governor, which differ in that in the first type the fixed contact is mounted on the base plate while the movable contact is mounted on the governor arm; while in the second type, both contacts are mounted on the motor frame and the movable contact is operated from the governor arm by a link coaxial with the motor shaft. The spring characteristic of either type of governor may have a wide range of values limited only by the requirement that when the spring members are disposed in, and extended to, the operating position the spring force shall balance the centrifugal force for such a motor speed that the mean motor speed will be kept within the required limits, as described above.

An isochronous governor is defined as having a spring characteristic such that at a predetermined speed the spring force will balance the centrifugal force acting on the governor arm for all possible positions of the arm. Hence if the speed of the motor rises above the predetermined speed by the smallest amount the governor arm will move outwards from the axis of rotation as far as it can; and if the speed falls below the predetermined speed by the smallest amount the governor arm will move inwards as far as it can.

The inward movement of the centrifugal governor arm is limited by the closing of the movable contact against the fixed contact, and the outward movement is limited by a back stop, which therefore determines the contact gap when the contacts are open. Erosion of the contacts with use causes the contact gap when the contacts are open to increase, and the mass of the movable contact to decrease, which effects produce a progressive change in the mean governed speed.

The object of the present invention is therefore to improve the design of centrifugal speed governors, including, in particular, those of the isochronous type, so that the effect of erosion of the contacts on the governed speed is negligible.

The invention depends on the consideration that the immediate effects of erosion are two-fold; first, the mass of the movable contact decreases, and second, the erosion of both the fixed and movable contacts causes an increase in the distance through which the governor arm has to move, between the contact face and the back stop. These two effects tend to cause changes of opposite sense in the governed speed of the motor. The change in governed speed due to the decrease in mass of the movable contact can be eliminated if this contact is arranged to be substantially coincident with the axis of rotation of the shaft on which the governor base plate is mounted, or if, as in the second type of governor, the contacts are removed from the rotating parts. The change of governed speed due to the increase in the contact gap can be reduced to negligible proportions by suitable design of the governor arm and spring. In the first type of governor it may, alternatively, be arranged that the changes in governed speed due to the two effects cancel one another out, as will be hereinafter explained.

The present invention therefore provides a centrifugal governor for governing the speed of an electric motor, comprising a pivoted governor arm mounted on a base plate rotatable by the motor, a first contact member controlled by said arm, a second contact member which co-operates with said first contact member to control the speed of the motor, and a spring force acting to oppose the centrifugal force which operates on said arm upon rotation of the base place, in which the two contacts are so positioned with respect to the point of pivot of the arm and the axis of rotation of the base plate that the governed speed of the motor is maintained substantially constant independent of erosion in use of the said contact members.

According to one example a governor of the first type is so arranged that the distance of the surfaces of the contact members when in contact, from the axis of rotation of the base plate is such that the effect of reduction of the mass of the moving contact on the mean governed speed is compensated by the effect of the increase in the contact movement, so that the mean governed speed is maintained substantially constant independent of erosion of the contacts.

According to another example a governor of either type is so arranged that the effect of the reduction of mass of the moving contact on the mean governed speed is substantially eliminated, and the effect of the increase of contact movement is reduced to a low value, so that the mean governed speed is maintained substantially constant independent of erosion of the contacts.

In this specification, when the "speed" of the motor is referred to, it will be understood to mean the angular velocity of rotation in radians per second.

Embodiments of the invention will be described with reference to the accompanying drawings, in which:

FIG. 1 shows diagrammatically a known form of centrifugal governor for an electric motor;

FIG. 2 shows the driving circuit for the motor;

FIG. 3 shows a graph used in explaining the operation of the governor; and

FIG. 4 shows a plan view of a centrifugal governor designed according to the invention.

FIGS. 5, 6 and 7 show a plan view and elevations of an alternative governor designed according to the invention.

FIG. 8 shows diagrammatically the lever system of FIGS. 5, 6 and 7.

FIG. 1 shows diagrammatically one well known form of centrifugal governor for an electrical motor. A disc or baseplate 1 is fixed to the shaft of the motor (not shown), and normal to the axis of rotation, the point O representing this axis. The governor comprises a suitably shaped governor arm 2 pivoted at P to a block (not shown) fixed to the plate 1. At the other end of the arm 2 is a contact 3 which is held against a fixed contact 4 mounted on the plate 1. The centre of mass of the contact 3 is denoted by C. A stretched helical spring 5 has one end attached to a block 6 fixed to the plate 1 and the other end attached to the arm 2 at a point Q, and holds the contacts 3, 4 closed. A stop 7 fixed to the plate 1 is provided to limit the movement of the governor arm 2.

FIG. 2 shows the circuit of the motor 8, the windings of which are connected by means of slip-rings (not shown) in series with the contacts 3 and 4 to terminals 9 and 10 connected to a source of power. The field winding of the motor is indicated at 11. Bridged across the contacts 3 and 4 is a resistor 12 and a spark-quench capacitor 13 in series with a limiting resistor 14. When the speed of the motor increases until the contacts 3 and 4 open, the resistor 12 is inserted in series with the driving source and causes the speed of the motor eventually to decrease.

In considering the action of the governor it will be assumed that, for the purpose of working out the motion of the governor arm under the action of the centrifugal force and the spring force, the governor arm and related movable parts such as the spring or springs 5 may be represented in terms of a point mass situated at M, the position of which, for the situation when the contacts are closed, is specified by $PM=r_2$, $OM=r$. The resultant centrifugal force acting on the governor arm and tending to rotate it about pivot P is therefore considered to act radially outwards through the point M, to be of magnitude $mr\omega^2$ where $m$ is the effective mass upon which the centrifugal force acts and $\omega$ is the motor speed, and to exert a moment on the governor arm about the pivot P of approximately $r_2 mr\omega^2$—see FIG. 1. The moment of inertia of the governor arm system for rotation about pivot P is taken as $m_1 r_2^2$, where $m_1 = m + m_2$ and $m_2$ is an effective mass which includes the effect of any parts, such as exist in a governor of the second type, which are moved by movement of the governor arm but do not contribute to the centrifugal force acting on the mass $m$.

The symbol $r_1$ will be employed to denote the distance PQ, FIG. 1, and $h$ to denote the increase in length of the spring 5 when stretched with the arm 2 in the position shown in FIG. 1, i.e. with the contacts closed.

A distance $b$ is defined as $$b = r - \left(\frac{r_2}{r_1}\right)h \qquad (1)$$

Let $\omega_0$ be the motor speed at which the contacts 3 and 4 are just on the point of opening. Then the moments about P exerted by the centrifugal force through M and by the spring force through Q must just balance one another; that is:

$$r_2 . mr\omega_0^2 = r_1 . kh \qquad (2)$$

where $k$ is the elasticity factor of the spring.

Eliminating $h$ from 1 and 2 gives $$k = mr\omega_0^2 \left(\frac{r_2}{r_1}\right)^2 \cdot \frac{1}{(r-b)} \qquad (3)$$

The speed of the motor is increasing when the contacts 3 and 4 open, and although the resistor 12 (FIG. 2) is inserted, the driving current does not decrease immediately because the spark-quench capacitor 13 starts to charge up. As a first approximation the motor speed can be considered to be increasing uniformly as the contacts are opening, and the capacitor is charging, the angular acceleration being $\alpha_1$ radians per second.

Let the distance OM (FIG. 1) be $r+s$ at time $t$ after the contacts have opened. At this time the motor speed is $\omega_0 + \alpha_1 t$ and the moment tending to rotate the governor arm about the pivot P is equal to the difference between the moments exerted by the centrifugal force and by the spring force. Hence:

$$r_2 m(r+s)(\omega_0+\alpha_1 t)^2 - r_1\left[h+\frac{r_1}{r_2}s\right]k = m_1 r_2^2 \cdot \frac{d^2\theta}{dt^2}$$

where $m_1 r_2^2$ is the effective moment of inertia of the governor arm as explained above, and $$\frac{d^2\theta}{dt^2}$$

is the angular acceleration of the governor arm about the pivot P.

The linear acceleration of the point M is given by:

$$\frac{d^2s}{dt^2} = r_2 \cdot \frac{d^2\theta}{dt^2}$$

Hence, substitution for $h$ from Equation 1 and for $k$ from Equation 3, gives:

$$\frac{d^2s}{dt^2} = \frac{m}{m_1}\left\{2\omega_0\alpha_1 t(r+s) - \frac{s\omega_0^2 b}{(r-b)} + \alpha_1^2 t^2(r+s)\right\} \qquad (4)$$

To solve this equation, approximations will be made based on the following considerations:

(1) $s$ is small compared with $r$
(2) $t$ is small compared with 1 second.
(3) $2\omega_0\alpha_1$ is of the same order as $\alpha_1^2$ Hence neglect of the terms $2\omega_0\alpha_1 ts$ and $\alpha_1^2 t^2(r+s)$ will not significantly affect the right hand side of Equation 4.

Equation 4 then reduces to $$d^2s/dt^2 + k_1 s = k_2 t \qquad (5)$$

in which $$k_1 = \frac{m}{m_1} \cdot \omega_0^2 \cdot \frac{b}{r-b}$$

and $$k_2 = \frac{m}{m_1} \cdot 2r\omega_0\alpha_1$$

Equation 5 is a standard differential equation whose solution for the conditions of FIG. 1 is $$s = \frac{k_2}{k_1}\left\{t - \frac{\sin\sqrt{k_1} \cdot t}{\sqrt{k_1}}\right\} \qquad (6)$$

Thus $s$ has a linear component and a sinusoidal component, and the sinusoidal component may have the undesirable effect of making the opening of the contacts indefinite, so tending to increase the erosion. The sinusoidal component can be eliminated by choosing $b=0$, from which also $k_1=0$. It can be shown that $b=0$ is also the condition for an isochronous governor.

Equation 6 is solved for the condition $k_1=0$ by putting $\theta = t\sqrt{k_1}$ and expanding sin $\theta$ in powers of $\theta$, and then putting $\theta = 0$.

The result is:

$$s = k_2 t^3/6 = mr\omega_0\alpha_1 t^3/3m_1 \qquad (7)$$

so $$t = (3sm_1/r\omega_0\alpha_1 m)^{1/3} \qquad (8)$$

Using Equations 7 and 8 the action of an isochronous governor will be examined with reference to FIG. 3, which shows the variations in the speed of the motor with respect to time. At time $t=0$ the speed is $\omega_0$, and the contacts 3 and 4 are just on the point of opening. As already explained, the speed of the motor increases with an acceleration $\alpha_1$, assumed constant. This continues for a time $t_1$ until the reduced driving current takes effect and reduces the speed of the motor. The speed of the motor has thus increased to $\omega_0+\omega_x$ where $\omega_x=\alpha_1 t_1$. It will be assumed that the acceleration of the motor is now $-\alpha_2$, so that after a time $t_2=\omega_x/\alpha_2$, the motor speed is reduced again to $\omega_0$.

During at least part of the time $t_2$, the governor arm 2 continues to move outwards, and the contact gap continues to increase, because of the momentum gained during the time $t_1$, and because an outward acceleration is maintained during the time $t_2$. It will be assumed that the contacts move outwards until prevented from further movement by the fixed back stop 7 shown in FIG. 1. Thus the contacts 3 and 4 do not close until some time after the motor speed is reduced to $\omega_0$ at the end of time $t_2$. When the contacts 3 and 4 close, they cut out the series resistor 12, but the driving current does not increase at once on account of the inductance of the motor windings. Thus the speed of the motor continues to fall for a time $t_3$ during which its angular velocity is reduced to $\omega_0-\omega_y$, where $\omega_y=\alpha_2 t_3$. At the end of the period $t_3$ the increase of the driving current has had time to take effect and the speed increases with acceleration $\alpha_1$ for a time $t_4$ where $\omega_y=\alpha_1 t_4$, and the speed of the motor is again $\omega_0$.

The above explanation is, of course, an approximation of the effects which actually occur. For example, the lines in FIG. 3 indicating the changes in speed are not really straight lines, as indicated, nor are the changes in acceleration as abrupt as would appear. The approximation is, however, good enough for the present purpose.

From the geometrical structure of FIG. 3 it will be appreciated that the mean angular velocity $\omega_m$ averaged over the period $t_1+t_2+t_3+t_4$ will be $$\omega_m=\omega_0+(\omega_x-\omega_y)/2 \qquad (9)$$

and this is what is called the governed speed of the motor.

The effect of contact erosion is in general to change progressively the governed speed $\omega_m$. There are two reasons for this as stated above.

(1) The removal of material from the movable contact 3 (FIG. 1) reduces the value of the effective mass $m$ acting at the point M. This makes the value of $\omega_0$ increase, thereby increasing $\omega_m$ unless the mass of the moving contact when closed, is arranged to be substantially at 0, where the centrifugal force associated with the removed material would be substantially zero.

(2) The removal of material from both the contacts causes the contact gap when the contacts are open to increase. This causes a corresponding increase in the distance moved through by the point M, with the result that $t_3$ and $\omega_y$ are increased, so reducing $\omega_m$.

Thus it will be appreciated that with an isochronous governor of the first type there will be a position for the contact gap rather close to 0 in which the effects (1) and (2) cancel out.

The desired position can be determined in the following manner.

Let the loss of material due to erosion of the movable contact 3 cause the value of $\omega_0$ to increase to $\omega_0+\Delta\omega_0$, and let the erosion of both the contacts cause the value of $\omega_y$ to increase to $\omega_y+\Delta\omega_y$. Then from Equation 9, $\omega_m$ will remain unaltered if $\Delta\omega_y=2\Delta\omega_0$.

The value of $\omega_0$ is determined by equating the moments of the centrifugal force about pivot P before and after the loss of mass $m_c$, since both moments must be equal and opposite to the moment of the spring force when the contacts are just about to open. Since the governor is isochronous, effect 2 produces no change in $\omega_0$. Therefore, if the distances from the centre of mass of the movable contact to points O and P are $r_c$ and $r_3$ respectively, $$r_2 r m\omega_0^2=(r_2 r m-r_3 r_c m_c)(\omega_0+\Delta\omega_0)^2 \qquad (10)$$

This gives, to first order in the small quantities $\left(\dfrac{m_c}{m}\right)$ and $\left(\dfrac{\Delta\omega_0}{\omega_0}\right)$ $$2\Delta\omega_0=\omega_0\left(\frac{m_c}{m}\right)(r_3/r_2)(r_c/r) \qquad (11)$$

Before erosion, let the distances moved through by the point M and by the movable contact 3, when the governor arm moves from the contacts closed position to the position in which its further outward movement is arrested by the back stop, be $s_0$ and $g_0$ respectively. Let the corresponding distances after erosion be $s_1$ and $g_1$ respectively.

At the end of time $t_2$ the governor arm is just about to start moving inwards. To determine a value for $\Delta\omega_y$, it will be assumed that the contacts just close again at the end of time $t_3$. Then $\omega_y=\alpha_2 t_3$, and $t_3$ may be obtained from Equation 8 if $\alpha_2$ is substituted for $\alpha_1$. The situation of practical interest corresponds to the case $s_1$ comparable with or larger than $2s_0$. It has already been assumed that $$\frac{\Delta\omega_0}{\omega_0}\ll 1 \text{ and } s_0/r_0\ll 1$$

since $\Delta r=(s_0-s_1)$ $$\frac{\Delta r}{r}\ll 1$$

also. Changes in $r$, and in $\omega_0$ due to the associated loss of mass, will therefore be neglected in the present calculation, to give, from Equation 8

$$\omega_y=\alpha_2^{2/3}\cdot\left(\frac{3}{r\omega_0}\right)^{1/3}\cdot s_0^{1/3} \qquad (12)$$

and, to a first approximation:

$$\Delta\omega_y=\alpha_2^{2/3}\cdot\left(\frac{3}{r\omega_0}\right)^{1/3}\cdot(s_1^{1/3}-s_0^{1/3}) \qquad (13)$$

Putting $2\Delta\omega_0=\Delta\omega_y$, and using the fact that $$s_1=\frac{r_2}{r_3}g_1 \text{ and } s_0=\frac{r_2}{r_3}g_0$$

gives, from Equation 11 and 13—

$$r_c=1.44\left(\frac{m}{m_c}\right)\left(\frac{r_2}{r_3\omega_0}\right)^{4/3}(r\alpha_2)^{2/3}(g_1^{1/3}-g_0^{1/3}) \qquad (14)$$

This is an equation which enables an estimate to be made of the optimum value of $r_c$—i.e. the distance OC for the new, unworn governor. To do this, a suitable value of $g_1$ must be substituted into the equation. This suitable value is derived from a consideration of the maximum practicable or tolerable value of $g_1$ in the given governor; it may, for example, be chosen as half the maximum practicable value, so that the computed value of $r_c$ corresponds to the optimum for that condition of the governor in which the contacts have been approximately half eroded away. Such an arrangement roughly minimises the effect of contact erosion on governed speed, considered over the whole life of the contacts.

It may be noted that $m_c$ is a function of $s_1$, and its value, for substitution in Equation 14, may be computed from a knowledge of $s_1$ and the area of the contacts, if uniform erosion over the contact area is assumed. Further, for substitution in Equation 14, the value of $\alpha_2$, which is the rate of reduction of the speed of the motor when the contacts are open, is preferably chosen to correspond to the mean load on the motor.

It is important to note that although it is preferable that $b=0$, as has been assumed above, this is not an essential condition. It can be shown that if $b$ is small compared with $r$, for example not more than about $r/2$, the difference between the values of $s$ given by Equations 6 and 7 is quite small, the effect of the sinusoidal component over the small range of values of $s$ concerned is negligible, and it is still possible to determine a value for $r_c$ for which the approximate compensation indicated by $\Delta\omega_y=2\Delta\omega_0$ is obtained.

FIG. 4 shows a plan view of a centrifugal governor of the first type designed to reduce the effect of contact erosion on the governed speed by the above described method of mutual cancellation of the effects of loss of mass and increase of contact gap. The governor arm comprises two main portions, namely a rectangular metal plate 15 and a second metal plate 16 fixed at right-angles to the plate 15 and carrying the moving contact 3 near the end. A thin elastic metal strip 17 is clamped between the two plates 15 and 16 as shown and is clamped at one end to a block 18 fixed to the base-plate 1. The strip 17 forms the hinge or pivot for the governor arm. It is important that when calculating the spring characteristic, the compliance of this hinge must be included. If desired, however, the governor arm may be pivoted on a knife edge.

The fixed contact 4 is carried by a right-angle bracket 19 which is fixed to the base plate 1.

The helical spring 5, shown in rectangular outline, is fixed at the lower end by means of an adjusting screw 20 to a block 21 mounted on the plate 1. The upper end of the spring 5 acts on a block 22 fixed at a distance $r_1$ from the hinge or pivot of the plate 15, the arrangement being such that the axis of the spring is normal to the plate 15, as shown, when the contacts 3, 4 are closed.

An adjustable stop 23 fixed to the plate 1 is provided to limit the movement of the governor arm.

The point O represents the axis of the motor shaft, not shown, to which the plate 1 is secured. The governor arm is so proportioned that the point M, defined in column 3, is as far from O as possible. The position of M and the adjustment of the tension of the spring 5 should preferably be such that the quantity $b$ is substantially zero, so that the governor is isochronous.

The centre of the contacts 3, 4 is on a line OC and the centre of mass of the moving contacts is at a distance $r_c$ from O as given by Equation 14. The distance $r_3$ is the distance of the centre of mass of the moving contact from the governor arm pivot.

In a particular case of an isochronous governor designed according to FIG. 4, the following values applied:

$r_1 kh = 2 \times 10^6$ dyne cm.
$g_0 = 0.03$ cm.
$g_s = 1.5$

A value of $r_c$ suitable to maintain substantially constant mean governed speed $\omega_m$ in this case was 0.2 cm., according to Equation 14.

The alternative method, mentioned above in column 2, for reducing the effect of contact erosion on the governed speed is now considered.

For either a governor of the second type, in which both contacts are removed from the rotating parts of the governor, or for a governor of the first type designed such that the movable contact in the contacts closed position is on the axis of rotation of the governor arm base plate, loss of mass by the movable contact does not significantly affect the value of $\omega_0$. In order to render negligible the variation of $\omega_m$ due to contact erosion, therefore, the governor arm must be designed such that the variation of $\omega_y$ due to contact erosion is reduced to a sufficiently small value. This is achieved by:

(a) making the increase in distance moved through by point M, $s_1 - s_0$, sufficiently small compared with the increase in the distance moved through by the movable contact, $g_1 - g_0$.

(b) reducing the rate of contact erosion, by increasing the speed of the movable contact when in movement between the fixed contact and the back stop, and the contact pressure when the contacts are closed.

Requirement (a) can be met my making the ratio $r_3/r_2$ sufficiently large.

With regard to requirement (b): for a single governor arm and spring, the contact pressure increases with increase of $m$ and increase of $kh$, and the acceleration of the movable contact increases with increase of the ratio $(m/m_1)$. The latter ratio is therefore made as large as possible consistent with the desirability of keeping $(r_3/r_2)$ large. Further, the contact pressure can be effectively doubled by employing two governor arms and two springs to control a single movable contact.

The speed of movement of the movable contact is also affected by the value of $b$, decreasing as $b$ increases. The optimum value for $b$ is therefore zero, corresponding to an isochronous governor.

FIGS. 5, 6 and 7 show a centrifugal governor designed to reduce the effect of contact erosion on the governed speed by the above described method of eliminating the effect of loss of mass, and reducing to a low value the effect of increase of contact gap. The governor is of the second type, and is advantageous in that it avoids the use of slip rings between the governor contacts and the motor circuit.

In FIGS. 5, 6 and 7, corresponding parts to those shown in FIGS. 1 and 4 are designated by the same number. It will be seen that the spring 5 has been duplicated, one spring being arranged on each side of the motor axis.

Each spring is anchored by means of an individual adjustment screw 31 to a common bar 32 that is anchored to the plate 1 by means of a common adjusting screw 33. By this means each spring can be separately adjusted to make the tensioning of the complete spring system, which includes the contact-operating spring 29, such as to cause the governor to operate at the speed required.

Each spring acts on its own arm 2, which pivots on a knife edge, so that the mass $m$ upon which centrifugal force is effective is also duplicated. The resultant centrifugal force may be considered to act through a point M situated generally as shown in FIG. 7.

The two arms, 2, are joined by a common axis bar to which is attached a common inwardly extended arm 24 that engages a rod 25 arranged to be coaxial with the motor shaft and to co-operate with a lever 26 pivoted at 27 and carrying at the end furthest from the pivot the movable contact 3 that engages the fixed contact 4.

The lever 26 has a horizontal arm 28 to which is attached a spring 29 that is anchored to an adjusting screw 30.

FIG. 8 shows the lever system employed in the governor of FIGS. 5, 6 and 7. The quantities $r$, $r_1$, and $r_2$ have an analogous significance to that ascribed to them in connection with FIG. 1. The quantities $r_4$, $r_5$ and $r_6$ denote the distances, from the pivot $P_1$, of the rod 25, the movable contact 3, and the point of attachment of spring 29, respectively.

The effective spring characteristic of the governor involves the characteristics of springs 5, of the pivot P (if this is a spring blade), of the pivot $P_1$, (if this is a spring blade—it is not shown as such in FIG. 5), and of the contact-operating spring 29.

Distance moved by the point M and by the contact 3 are related by:

$$s = g\left(\frac{r_4 r_2}{r_5 r}\right) \qquad (15)$$

and the isochronous condition corresponds to:

$$h_1 = h\left(\frac{r r_6}{r_1 r_4}\right) \qquad (16)$$

where $h$ and $h_1$ are extensions of springs 5 and 29 respectively in the contacts closed position.

In a particular case of an isochronous governor designed according to FIGS. 5, 6 and 7, the following values applied:

$r_1 kh = 2.7 \times 10^6$ dyne cm. for each of spring 5.

$\frac{h_1}{h} = 1$.

$g_0 = 0.03$ cm.

$g/s = 2$.

The embodiment of FIGS. 5, 6 and 7 is advantageous in that it gives rise to the possibility of making a fine adjustment to the governed speed of a substantially isochronous governor, when the governor is running, by the adjustment of the contact spring adjustment screw 30.

The embodiments of the present invention shown in FIG. 4 and in FIGS. 5, 6 and 7 possess, as a subsidiary advantageous feature, a governor arm and spring system designed, according to considerations set out below, to employ the space available in the governor housing for the spring or springs with maximum efficiency, such that the pressure between the two contact members when in contact is a maximum, and spring fatigue is a minimum. The design further ensures the retention of this advantageous feature in a governor which is adjustable to operate at more than one governed speed, which adjustment is carried out by the replacement of one component of the governor system by a similar component of suitably modified geometry or mass, as described below.

The space available for the spring determines the outside diameter and the extended length of the spring. The spring stress corresponding to the extended length is then chosen as high as possible consistent with its remaining well within the fatigue limit. In order to have maximum pressure between the two contact members when they are in closed position, as large a value as practicable of the ratio $r_3/r_1$ is chosen, so that the movement of the governor arm between the back stop and the fixed contact member produces only a relatively small decrease in the extension of the governor spring. The point of attachment of the spring to the governor arm is therefore located near to the governor arm pivot, i.e. the point Q in FIG. 4, for example, preferably lies between M and the pivot point, as shown in FIG. 4. Finally, the value of the mass $m$ is chosen to give the value of $\omega_0$ appropriate to the required governed speed $\omega_m$. The governor is conveniently adjustable to operate at a changed governed speed, therefore, by the replacement of the governor arm by another arm of suitably different mass.

The above method of adjustment of the governed speed of the governor therefore, enables the optimum spring design described above to be retained for all the available governed speds, in contrast to a known method of adjustment which is effected by a change of, or a change in the tensioning of, governor spring or springs.

In the case of the embodiment of FIGS. 5, 6 and 7 the governor arm is held on its knife edge pivot, and against the fixed contact, by the pressure due to the spring force, and by no other means. If the spring force is released, therefore, the arm can readily be removed and replaced by another arm of different mass.

For either of the embodiments an arm of appropriately changed thickness can provide an arm of suitably changed mass in which such geometrical quantities remain unchanged as ensure the retention of the various advantageous features of design described above.

It should be noted that the embodiments of the invention have been described with reference to the governing of a series wound electric motor, as shown in FIG. 2. They may, however, equally well be employed to govern a shunt wound motor, provided with an impedance in the field winding circuit, by interchanging the functions of the fixed contact and the back stop.

It is to be understood that the foregoing description of specific examples of this invention is not to be considered as a limitation on its scope.

What I claim is:

1. A centrifugal governor for governing the speed of a motor comprising:
   a base plate coupled to the motor shaft for rotation, the plane of said base plate being substantially perpendicular to the axis of said shaft;
   a governor arm pivotally mounted on said base plate;
   a first contact member controlled by said arm;
   a second contact member which cooperates with said first contact member to control the speed of the motor; and
   a spring connected at one end to said base plate and at the other end to said arm, said spring opposing the centrifugal force which operates on said arm upon rotation of said base plate;
   said first and second contact members having a closed position with respect to the pivot point of said arm and the axis of rotation of said base plate, said closed position being chosen according to the following relationship:

$$r_c = 1.44 \left(\frac{m}{m_c}\right)\left(\frac{r_2}{r_3 \omega_0}\right)^{4/3} (ra_2)^{2/3} (g_1^{1/3} - g_0^{1/3})$$

where: $r_c$ represents the distance between the first contact member and the axis of rotation of said base plate, $m$ and $m_c$ represent respectively the effective mass of the said arm together with the load thereon, and the mass which is lost due to erosion in use of the said first contact; $r_2$, $r_3$ and $r$ respectively denote the distance between the point at which the effective mass $m$ can be considered concentrated and the pivot point of said arm, the distance between the said first contact member and the said pivot point, and the distance between the said point at which said effective mass can be considered concentrated and the axis of rotation of said base plate; $a_2$ represents the acceleration of said first contact member during movement between fully opened and closed positions thereof; and $g_0$ and $g_1$ represent the respective distances moved through by said first contact member before and after undergoing erosion in use.

2. A centrifugal governor according to claim 1 wherein the centers of the surfaces of contact of the two contact members when in contact are situated on the axis of rotation of the base plate, thereby nullifying the effect on the governed speed of the loss of mass of the first contact member due to erosion in use, and wherein the ratio of the distances to the point of pivot of the governor arm, of the contact surface of the first contact member, and of the point through which the resultant centrifugal force on the arm acts, respectively, is sufficiently large to render negligible the effect on the governed speed of the increase of contact movement due to erosion in use of both contact members.

3. A centrifugal governor according to claim 2 wherein said arm is provided with first and second extensions and comprising first and second springs coupled to said respective extensions of said arm for exerting increased contact pressure between said contact members for a given departure of the motor speed from the mean governed speed, while conserving the volume of space allocated to the governor, for improved efficiency of operation.

4. A centrifugal governor according to claim 1 wherein the first and second contact members are mounted on a member that is stationary with respect to the motor frame, and comprising a link coaxial with the axis of rotation of the base plate for operating said first contact member in response to movement of said arm, thus avoiding the effect on the governed speed of which would otherwise result from loss of mass of the first contact member due to erosion in use, and wherein the ratio rendered negligible by providing a sufficiently large ratio of distance moved through by the first contact member to the corresponding distance moved through by the point through which the resultant centrifugal force on the governor arm acts is sufficiently large to render negligible the effect on the governed speed of the increase of contact movement due to erosion in use of both contact members.

5. A centrifugal governor according to claim 4, in which the first contact member is acted upon by a spring which spring is anchored to a member that is stationary with respect to the motor frame, and is provided with a screw by means of which its tension may be changed.

6. A centrifugal governor for governing the speed of a motor comprising: a pivoted arm; a base plate on which said arm is mounted, said base plate being adapted for rotation by said motor; first and second co-effective contact members for controlling said motor; a spring member coupled to said arm and acting to oppose the centrifugal force which operates on said arm due to rotation of said base plate; and means for positioning said first and second contact members such that the closed position of said contact members is located according to the following relationship:

$$r_c = 1.44 \left(\frac{m}{m_c}\right)\left(\frac{r_2}{r_3 \omega_0}\right)^{4/3} (ra_2)^{2/3} (g_1^{1/3} - g_0^{1/3})$$

where: $r_c$ represents the distance between the first contact member and the axis of rotation of said base plate, $m$ and $m_c$ represent respectively the effective mass of the said arm together with the load thereon, and the mass which is lost due to erosion in use of the said first contact; $r_2$, $r_3$ and $r$ respectively denote the distance between the point at which the effective mass $m$ can be considered concentrated and the pivot point of said arm, the distance between the said first contact member and the said pivot point, and the distance between the said point at which said effective mass can be considered concentrated and the axis of rotation of said base plate; $a_2$ represents the acceleration of said first contact member during movement between fully opened and closed positions thereof; and $g_0$ and $g_1$ represent the respective distances moved through by said first contact member before and after undergoing erosion in use.

References Cited by the Examiner

UNITED STATES PATENTS

| | | | |
|---|---|---|---|
| 1,982,000 | 11/34 | Griffith | 200—80 |
| 2,235,481 | 3/41 | Hennig | 200—80 |
| 2,538,410 | 1/51 | Bretch | 310—68.5 |
| 2,761,031 | 8/56 | McDonald | 310—68.5 |

BERNARD A. GILHEANY, *Primary Examiner.*

MILTON O. HIRSFIELD, *Examiner.*